June 10, 1952 — F. G. DAVIS — 2,600,214
ADJUSTABLE BOLT-HOLDING WRENCH
Filed March 30, 1951
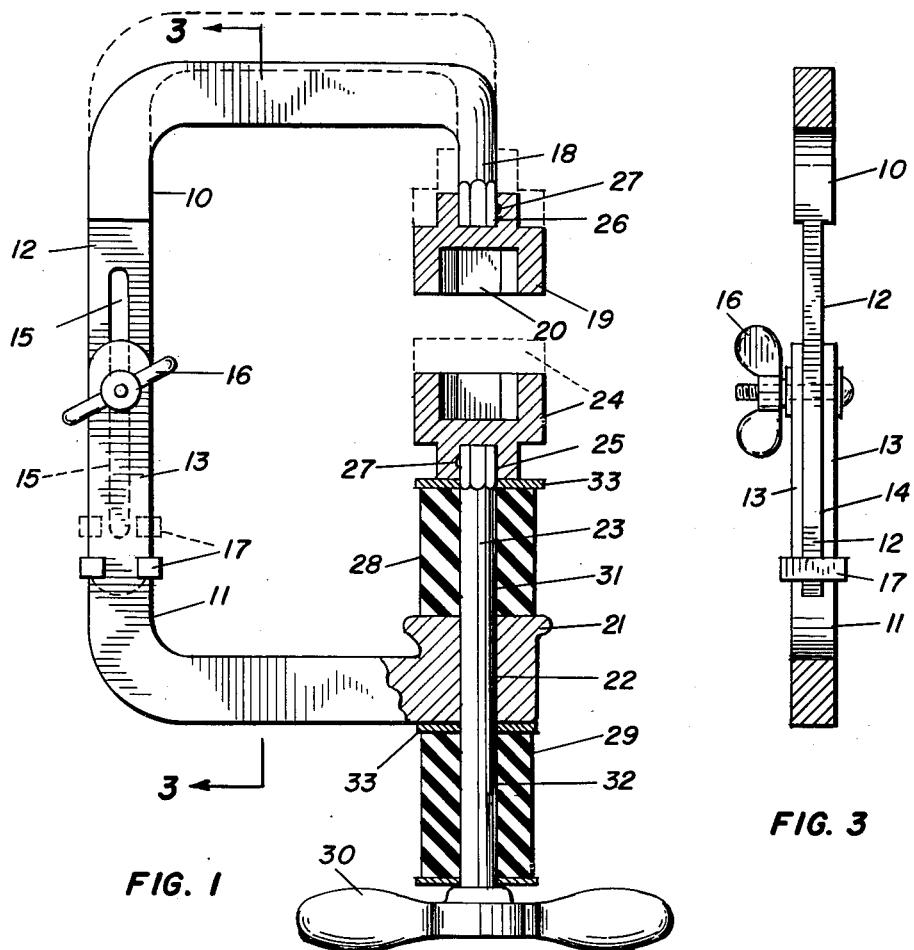
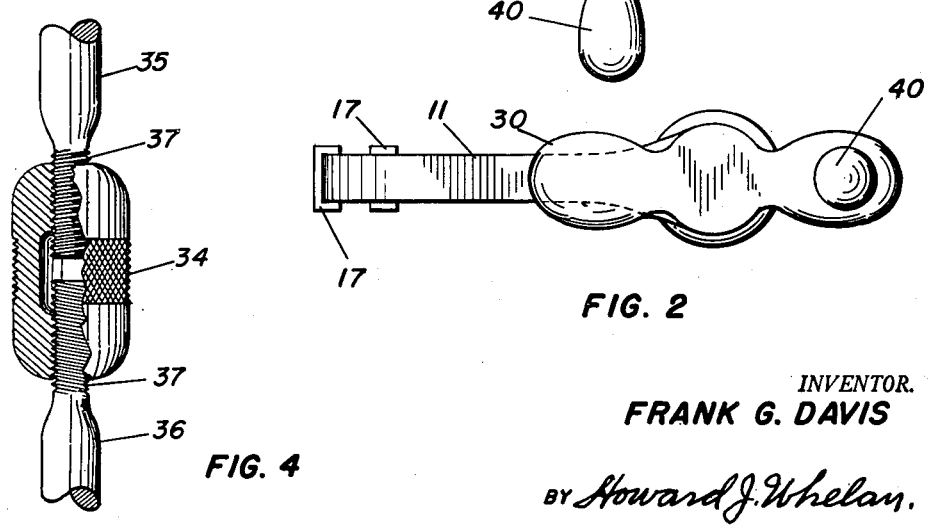
INVENTOR.
FRANK G. DAVIS
BY Howard J. Whelan.
ATTORNEY Patented June 10, 1952

2,600,214

UNITED STATES PATENT OFFICE 2,600,214

ADJUSTABLE BOLT-HOLDING WRENCH

Frank G. Davis, Baltimore, Md.

Application March 30, 1951, Serial No. 218,420

2 Claims. (Cl. 81—55)

This invention relates to mechanical tools and more particularly to those intended for the removal and placement of bolts and nuts in locations hard to get at with conventional tools.

This tool is primarily designed to be used for the removal of nuts and bolts from machinery such as those that hold an underpan of an internal combustion engine, where means must be employed to hold the head of a bolt on an upper face while a nut opposite it on a lower face is loosened. To accomplish this a C-form of tool with interchangeable sockets adapted to engage the head and nut of a bolt and bridge over the intervening joint is used. It is made easily adjustable so it can be readily fitted into place. In addition resilient members or rubber bumpers are placed on the rotatable stem and connected with the lower socket to give a certain amount of resiliency thereto while being operated.

It is an object of this invention to provide a new and improved adjustable C-frame tool that will avoid some of the disadvantages and limitations that similar tools, used heretofore, have had.

Another object of the invention is to provide a C-frame tool that can be effectively used for the removal of nuts and the like from bolts without additional tools for holding them while doing so.

For an understanding of the invention and its objects, reference is made to the accompanying drawings wherein a particular form of the invention is illustrated by way of example, while the following description explains its details and the claims indicate the scope of the invention.

Referring to the drawings:

Figure 1 is a side elevation, partly in section, of an adjustable C-frame tool embodying this invention and employed for operating bolts and nuts and the like;

Figure 2 is an end view of Figure 1;

Figure 3 is a sectional elevation on line 3—3 of Figure 1; and

Figure 4 is a modified form of the expansion unit.

The same reference numerals are used for the same parts throughout the drawings.

The drawings illustrate a form of tool preferably used for the removal of a nut from a bolt. It is of C-like contour with its back portion made separable in two parts 10 and 11 for adjusting purposes.

They fit together as shown in Figures 1 and 3 by making the lower portion 11 bifurcated at 13 so as to clamp the single tongue part 12 of the upper portion 10. Slots 14 and 15 are provided respectively in these parts to allow a wing bolt 16 to be adjusted therein and clamp the parts firmly. When so clamped the back of the C-frame is held rigid and of the length selected. The clip 17 serves as a guide to hold the parts in alignment and facilitates the adjustment.

The front of the C-frame is provided with a pending leg 18 of irregular form arranged to fit into recess 26 of a removable socket 19 of suitable form to suit the work to be done. It is shown with a hexagonal recess 20 therein to take a hexagonal nut, or bolt head of the proper size. The base 21 projects up from the lower front portion of the frame and has a passage 22 in it. An adjusting stem 23 slides in the passage 22 and supports a socket 24 on the end facing the socket 19. The end portion of the stem 23 is of irregular form and fits into an irregular formed recess 25 in the socket 24. The leg 18 and stem 23 have ball catches 27 to hold the sockets 19 and 24 in place yet allow their removal when desired. A handle 30 having a knob 40 for quick operation is attached to the stem 23 for its manipulation. In order to provide a predetermined amount of resiliency to the sockets of the tool, bumpers 28 and 29 preferably of soft rubber are provided with axial passages 31 and 32 respectively that enable the stem 23 to pass freely therethrough. Washers 33 tightly pressed on the stem 23 are used against the end faces of the bumpers to distribute the pressure on them over the whole face of the bumpers.

In the modified form shown in Figure 4 a coupling or turnbuckle nut 34 is mounted on the round back part 35 and 36 of the frame and adjusts the length of the latter by screwing on the screw threads 37 formed on them.

The device is operated in a conventional manner, as already referred to, and holds the nut and bolt head in a resilient manner. The bumpers make the handling of the tool easy and less liable to injure the user's hands. The handle 30 is pressed in and rotated to operate the socket 24 and actuate the nut or bolt head as the case may be, so as to secure or remove the bolt or nut operated on. At the same time, the socket 19 holds the opposite nut or bolt steady. This can be done with one hand in may instances.

While but two general forms of the invention are shown in the drawings and described in the specification, it is not desired to limit this application for patent to these particular forms as it is appreciated that other forms of construction could be made that would use the same principles and come within the scope of the appended claims.

Having thus described the invention what is claimed is:

1. A nut removing tool comprising a C-shaped arm, means for adjusting the length of the back portion of said arm, a first socket detachably mounted on the upper front portion of the arm, a rotatable stem extending through the lower front portion of the arm, a second socket carried by the upper end of said stem in alignment with the first mentioned socket, and cushioning means carried by said stem on each side of the aforesaid lower front portion of the arm, whereby the second socket is cushioned in either direction of rotation of the stem.

2. A nut removing tool as set forth in claim 1, wherein the cushioning means consists of a pair of rubber bumpers.

FRANK G. DAVIS.

REFERENCES CITED

The following references are of record in the file of this patent:

UNITED STATES PATENTS

| Number | Name | Date |
|---|---|---|
| 415,114 | Martin | Nov. 12, 1889 |
| 1,208,449 | Attwasser | Dec. 12, 1916 |
| 1,294,857 | Yuncker | Feb. 18, 1919 |
| 2,394,027 | Vlass | Feb. 5, 1946 |
| 2,417,757 | Hoff | Mar. 18, 1947 |

FOREIGN PATENTS

| Number | Country | Date |
|---|---|---|
| 6,155 | Great Britain | of 1909 |